(12) United States Patent
Hawkins et al.

(10) Patent No.: US 10,118,114 B2
(45) Date of Patent: Nov. 6, 2018

(54) FILTER WITH SHIELDED INTERNAL GASKET

(71) Applicant: CUMMINS FILTRATION IP, INC., Minneapolis, MN (US)

(72) Inventors: Charles W. Hawkins, Sparta, TN (US); Ismail C. Bagci, Cookeville, TN (US); Hendrik Amirkhanian, Cookeville, TN (US)

(73) Assignee: Cummins Filtration IP, Inc., Columbus, IN (US)

(*) Notice: Subject to any disclaimer, the term of this patent is extended or adjusted under 35 U.S.C. 154(b) by 705 days.

(21) Appl. No.: 13/774,540

(22) Filed: Feb. 22, 2013

(65) Prior Publication Data

US 2013/0220914 A1 Aug. 29, 2013

Related U.S. Application Data

(60) Provisional application No. 61/602,323, filed on Feb. 23, 2012.

(51) Int. Cl.
*B01D 35/30* (2006.01)
*B01D 27/08* (2006.01)

(52) U.S. Cl.
CPC .......... *B01D 35/30* (2013.01); *B01D 27/08* (2013.01); *B01D 2201/34* (2013.01)

(58) Field of Classification Search
CPC ....... B01D 35/00; B01D 35/31; B01D 35/306
See application file for complete search history.

(56) References Cited

U.S. PATENT DOCUMENTS

| | | | | |
|---|---|---|---|---|
| 3,610,666 A * | 10/1971 | Tyler | ............................ | 285/337 |
| 4,253,954 A * | 3/1981 | Midkiff et al. | ............... | 210/315 |
| 4,316,801 A * | 2/1982 | Cooper | .......................... | 210/90 |
| 5,209,845 A * | 5/1993 | Sims | ..................... | B01D 35/30 |
| | | | | 210/232 |
| 5,556,542 A * | 9/1996 | Berman | ................ | B01D 27/06 |
| | | | | 210/232 |
| 5,906,736 A * | 5/1999 | Bounnakhom | ........ | B01D 27/08 |
| | | | | 210/232 |
| 2002/0125188 A1 | 9/2002 | Hacker et al. | | |

(Continued)

FOREIGN PATENT DOCUMENTS

| | | |
|---|---|---|
| AU | 2007202172 | 12/2008 |
| JP | 2011-062658 | 3/2011 |

OTHER PUBLICATIONS

International Search Report for international application No. PCT/US2013/027321, dated Jun. 3, 2013 (3 pages).

(Continued)

*Primary Examiner* — Lucas A Stelling
*Assistant Examiner* — Angel Olivera
(74) *Attorney, Agent, or Firm* — Foley & Lardner LLP (57) ABSTRACT

A spin-on fluid filter with improved attachment and sealing with the filter head. The filter has a gasket positioned at the end of threads used to connect the filter to a filter head. The described design protects the gasket from excessive engine heat, cut or tear damage during installation, and the roll out effect of installation torque. In addition, the described attachment provides gasket protection and uniform compression of the gasket. The gasket can be any type that provides a seal which keeps external threads on the filter and the filter head dry.

8 Claims, 6 Drawing Sheets

(56) References Cited

U.S. PATENT DOCUMENTS

2002/0139735 A1   10/2002   Stenersen et al.
2009/0236277 A1*   9/2009   Kurth ..................... C02F 9/005
                                                            210/234
2010/0155316 A1    6/2010   Hussain
2011/0139699 A1    6/2011   Tucker et al.

OTHER PUBLICATIONS

Written Opinion for international application No. PCT/US2013/027321, dated Jun. 3, 2013 (5 pages).
First Office Action and English Language Translation for Chinese Patent Application No. 201380007592.3, dated Feb. 6, 2016, 14 pages.

* cited by examiner

FILTER WITH SHIELDED INTERNAL GASKET

FIELD

This disclosure describes a spin-on filter with improved attachment and sealing with an attachment structure.

BACKGROUND

Conventional spin-on filters are provided with an external gasket that is disposed at or near the end of the filter that is intended to seal with a filter head on which the filter is mounted. However, the location of the gasket renders it susceptible to tearing or extrusion during installation of the filter. In addition, in some circumstances, the gasket can be exposed to excessive engine heat.

SUMMARY

A filter is described that is attachable to an attachment structure, such as a filter head. The filter is designed to provide a protected shield for an internally disposed gasket which insulates the gasket from engine heat, contamination from threads during service, and installation damage.

In one particular embodiment, the filter is a spin-on filter that is attachable to a filter head of an engine and that filters oil or other engine fluid. However, the concepts described herein can be applied to other types of filters, attachable to other attachment structures and that filter other fluids.

The spin-on filter includes a threaded nutplate that threads onto suitably arranged threads on the head. The gasket is securely positioned within the attachment region of the nutplate of the filter which helps to maintain gasket retention during installation.

In one embodiment, a recessed surface on the filter head helps to provide protection from water, dirt and road debris during operation. A radial seal, for example an o-ring or foam style seal, can also be utilized to provide added dust and debris protection.

The engine filter head has external threads and a sealing surface at the end of the threads. In one embodiment, small radial rings can be provided on the sealing surface to provide a more robust sealing surface with no machining required. In one embodiment, the contact surface can be slightly recessed to allow the filter, when properly installed, to be slightly below the mounting surface and provide protection from water, dirt and road debris.

The disclosed design also protects the gasket from excessive engine heat, cut or tear damage during installation, and the roll out effect of installation torque. In addition, the described attachment provides gasket protection and uniform compression of the gasket. The gasket can be, for example, a rectangular gasket, have a tapered face, an o-ring, an irregular gasket, and other shapes and designs that provide a seal which keeps external threads on the filter and the filter head dry.

An adaptor can also be attached to the head using the same threads and sealing surface as the filter but incorporating a threaded center spud to allow the use of a conventional spin-on filter. This would seal below the threads in the same manner as described above as well as provide a seal for the center spud.

DETAILED DESCRIPTION

Figure 1:
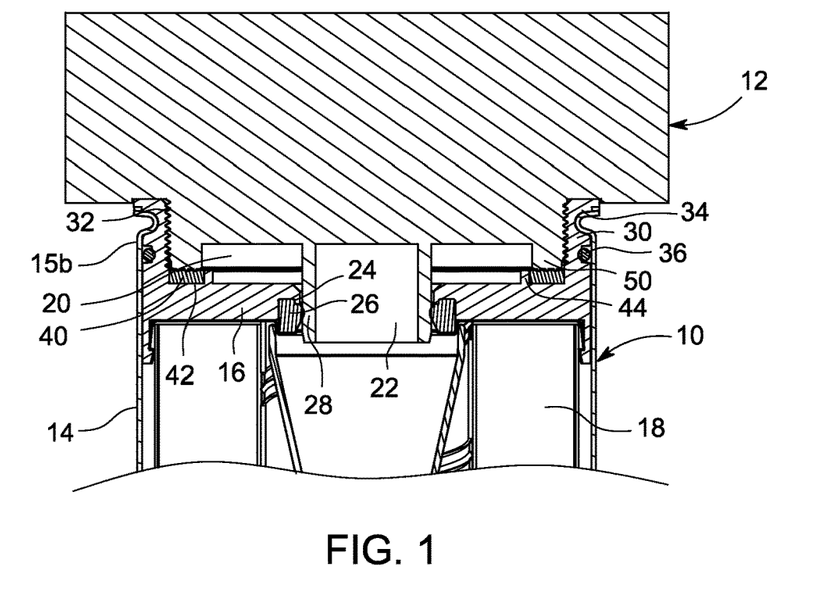
FIG. 1 is a partial cross-sectional view of a filter described herein attached to a filter head.
Figure 5:
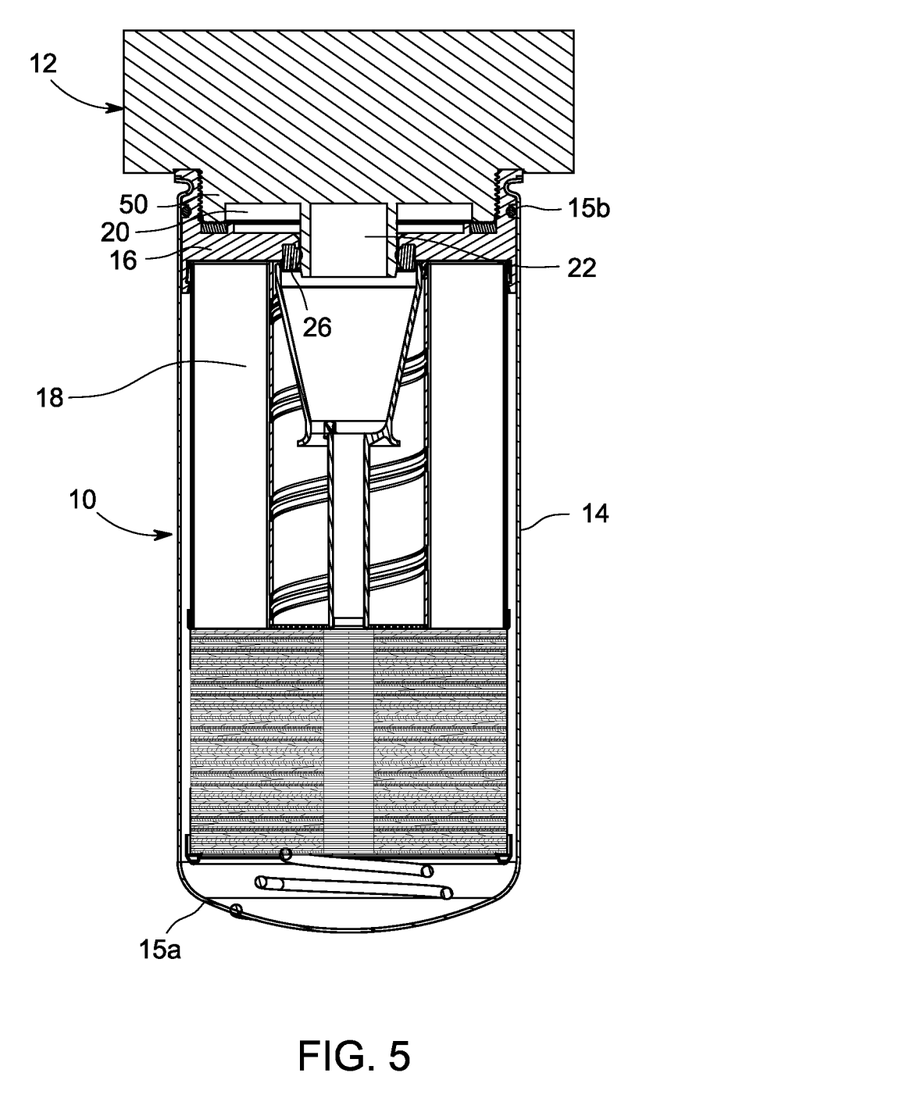
FIG. 5 is a cross-sectional view of the entire filter of FIG. 1 with the filter completely installed on the head.

With reference to FIGS. 1 and 5, a filter 10 is shown attached a filter head 12. The filter head 12 can be disposed within an engine or other location for receiving the filter 10. In one embodiment, the filter 10 is a lube filter that filters oil used by the engine. However, the filter 10 can be other types of filters used to filter other types of engine fluids, such as fuel or hydraulic fluids. In addition, the filter 10 can be used in non-engine applications and can be used to filter other types of fluid, including water or air.

The filter 10 includes an outer shell 14 of metal or plastic. The shell 14 includes a closed end 15*a* (FIG. 5) and an open end 15*b* that is closed by a nutplate 16. The interior of the shell 14 is provided with filtration media 18 for filtering a fluid, for example oil, fuel, hydraulic fluid, or other fluid, that enters the filter 10 so as to be filtered. As would be understood by a person of ordinary skill in the art, the nutplate 16 has one or more inlet openings 19 (see FIG. 2) that allow fluid to be filtered to enter the filter from an inlet region 20. After being filtered, the filtered fluid flows out through a central outlet 22. Further details on the general construction and operation of a spin-on type of filter can be found in U.S. Pat. No. 5,906,736 which is incorporated herein by reference in its entirety.

With continued reference to FIGS. 1 and 5, the nutplate 16 includes a central opening 24 that is provided with a circumferential gasket 26 for sealing with an outlet tube 28 of the filter head 12. The gasket 26 prevents mixing of unfiltered fluid with the filtered fluid. The gasket 26 is circumferentially continuous and faces radially inward.

The nutplate 16 also includes an axially extending continuous rim 30 on the radial outer edge thereof. Internal threads 32 are formed on the internal surface of the rim 30. The outer surface of the rim 30 is provided with a groove 34 into which the end of the shell 14 is deformed for connecting the shell and the nutplate 16. A seal 36 disposed in a sealing groove on the rim 30 seals between the shell and the nutplate.

A gasket seal 40 is disposed within a groove 42 formed at the base of the threads 32. The groove 42 is formed between an inner surface of the rim 30 and a circumferential flange 44 that is formed on and projects upwardly from the upper surface of the nutplate. Alternatively, the groove 42 could be formed by a recess formed in the top surface of the nutplate or by other means. The gasket seal 40 provides a seal between the filter 10 and the filter head 12 to prevent fluid leakage to the outside of the filter. In use, the seal is circumferentially continuous and faces axially upwardly in a direction away from the closed end of the shell and toward the filter head.

The filter head 12 includes an externally threaded flange 50 that is configured to engage with the threads 32 on the rim 30 for securing the filter 10 to the filter head 12. The base 52 of the flange 50 is configured to engage with and compress the gasket 40. In particular, with reference to FIGS. 2 and 3, the base 52 of the flange 50 includes one or more, for example three, radially spaced circumferential rings or flanges 54 on the bottom surface thereof and projecting downwardly from the bottom surface. The rings 54 help provide a more robust sealing surface.

Figure 3:
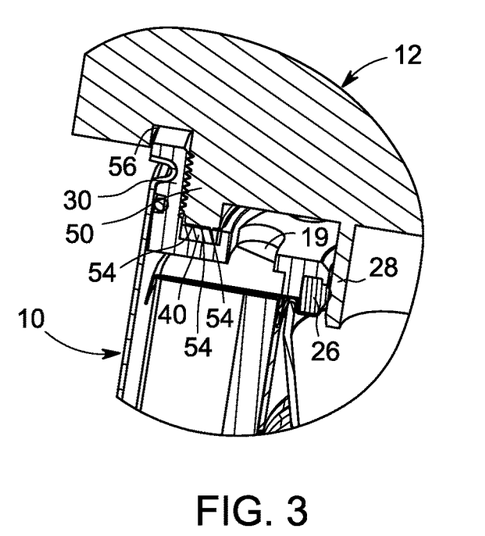
FIG. 3 is a partial cross-sectional, isometric view of a portion of the filter and the filter head during attachment, with the end of the filter about to enter the recess in the filter head.

When the filter 10 is threaded onto the filter head 12, the base 52 of the flange 50 engages and seals with the gasket 40. The flange 50 axially compresses the gasket 40 during installation to enhance the seal. To limit compression of the gasket 40, the filter head 12 is provided with a circumferential recess 56 that in use receives the end of the rim 30 as shown in FIGS. 1 and 3. The end of the rim 30 bottoming out in the recess 56 acts as a stop to limit over tightening of the filter 10 and over-compression of the gasket 40. In addition, the recess 56 allows the end of the rim 30 to be slightly recessed below the mounting surface of the filter head to provide protection from water, dirt and road debris.

Figure 2:
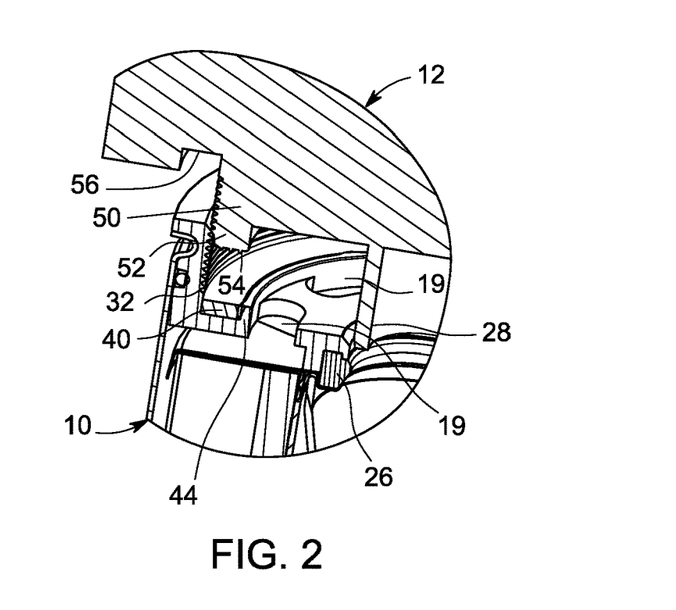
FIG. 2 is a partial cross-sectional, isometric view of a portion of the filter and the filter head during attachment, as the filter is being threaded onto the filter head.

In the embodiment illustrated in FIGS. 1-3, the gasket 40 is rectangular in cross-section. However, the gasket can be an o-ring, an irregular gasket, or have other shapes and designs that one finds suitable for providing the intended sealing function and any other functions of the gasket 40.

The gasket 40 can fill substantially the entire area of the groove 42, or a small space can be provided between a side of the gasket 40 and the flange 44 or the inner surface of the rim 30 to allow expansion of the gasket 40 during compression.

Figure 4:
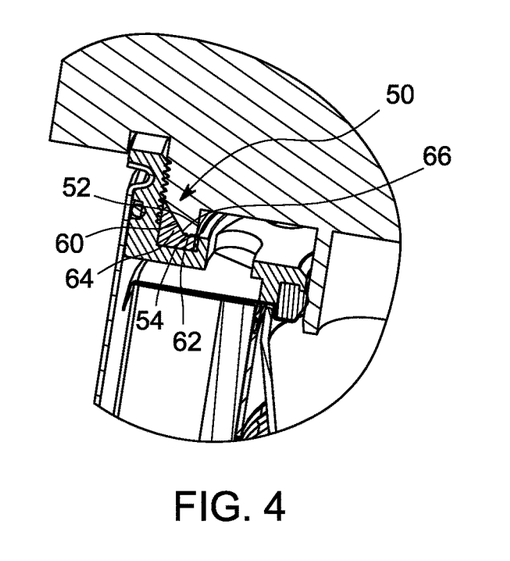
FIG. 4 is a partial cross-sectional, isometric view of a portion of another embodiment of a filter attached to the filter head, where the filter uses a tapered gasket and the filter head uses a corresponding tapered end.

In an alternative embodiment shown in FIG. 4, the base 52 of the flange 50 can have a tapered or angled surface 60 that extends from a flat portion 62 containing one or more of the downwardly projecting annular rings 54. The gasket includes a corresponding tapered or angled surface 64 that engages with the surface 60, and a flat portion 66 that engages with the flat portion 62.

Figure 6:
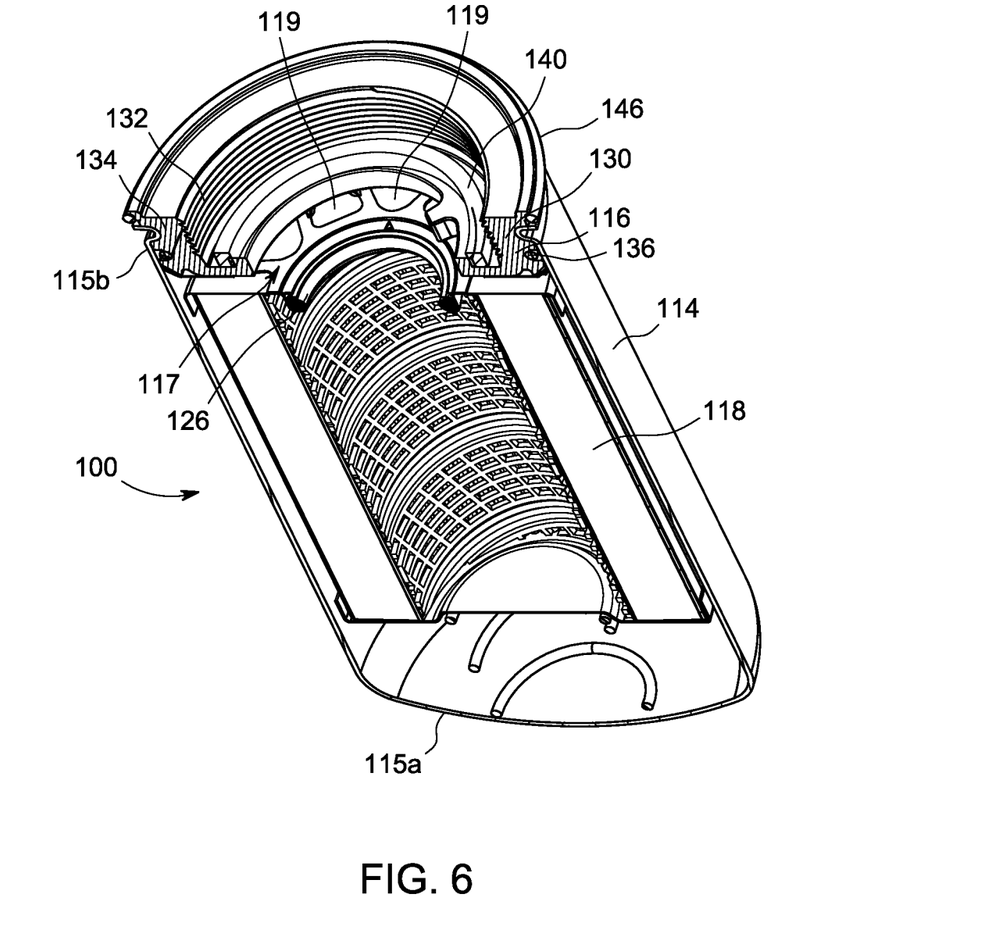
FIG. 6 is a cross-sectional, isometric view of another embodiment of a filter.
Figure 7:
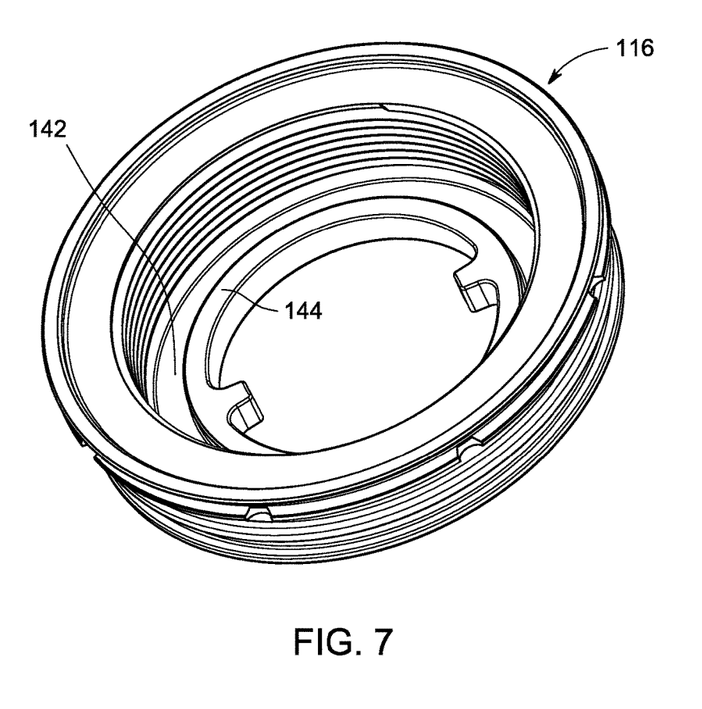
FIG. 7 is an isometric view of the nutplate of the filter of FIG. 6.

FIGS. 6 and 7 illustrate another embodiment of a filter 100 that is to be attached to a filter head (not shown). This embodiment differs from the embodiment illustrated in FIGS. 1-5, in that the sealing gasket for sealing with the outlet tube of the filter head is supported by a separate plate structure that is disposed between the filter and the nutplate, rather than being supported directly by the nutplate.

The filter 100 includes an outer shell 114 having a closed end 115a and an open end 115b that is closed by a nutplate 116. The interior of the shell 114 is provided with filtration media 118 for filtering a fluid, for example oil, fuel, hydraulic fluid, or other fluid, that enters the filter 100 so as to be filtered.

A plate 117 is disposed between the nutplate 116 and the end of the filtration media 118 that has one or more inlet openings 119 that allow fluid to be filtered to enter the filter. After being filtered, the filtered fluid flows out through a central outlet defined by the plate 117.

The plate 117 includes a central opening defining the central outlet that is provided with a circumferential gasket 126 for sealing with an outlet tube of the filter head. The gasket 126 faces radially inward and prevents mixing of unfiltered fluid with the filtered fluid.

The nutplate 116 also includes an axially extending continuous rim 130 on the radial outer edge thereof. Internal threads 132 are formed on the internal surface of the rim 130. The outer surface of the rim 130 is provided with a groove 134 into which the end of the shell 114 is deformed for connecting the shell and the nutplate 116. A seal 136 disposed in a sealing groove on the rim 130 seals between the shell and the nutplate.

A gasket seal 140 is disposed within a groove 142 formed in the nutplate 116 at the base of the threads 132. The groove 142 is formed between an inner surface of the rim 130 and a circumferential flange 144 that is formed on and projects upwardly from the nutplate 116. The gasket seal 140, which faces axially upward in a direction away from the closed end of the shell, provides a seal between the filter 100 and the filter head to prevent fluid leakage to the outside of the filter.

In the embodiment illustrated in FIGS. 1-3, the gasket 140 is rectangular in cross-section. However, the gasket can be an o-ring, an irregular gasket, or have other shapes and designs that one finds suitable for providing the intended sealing function and any other functions of the gasket 140. As shown in FIG. 6, the gasket 140 does not fill the entire space of the groove 142. Instead, in this embodiment, a space is left between the outer perimeter of the gasket 140 and the inner surface of the rim 130 to allow expansion of the gasket 140 during compression.

The filter 100 also includes an additional seal 146 disposed at the top of the shell 114 to seal between the shell and the nutplate 116.

Figure 8:
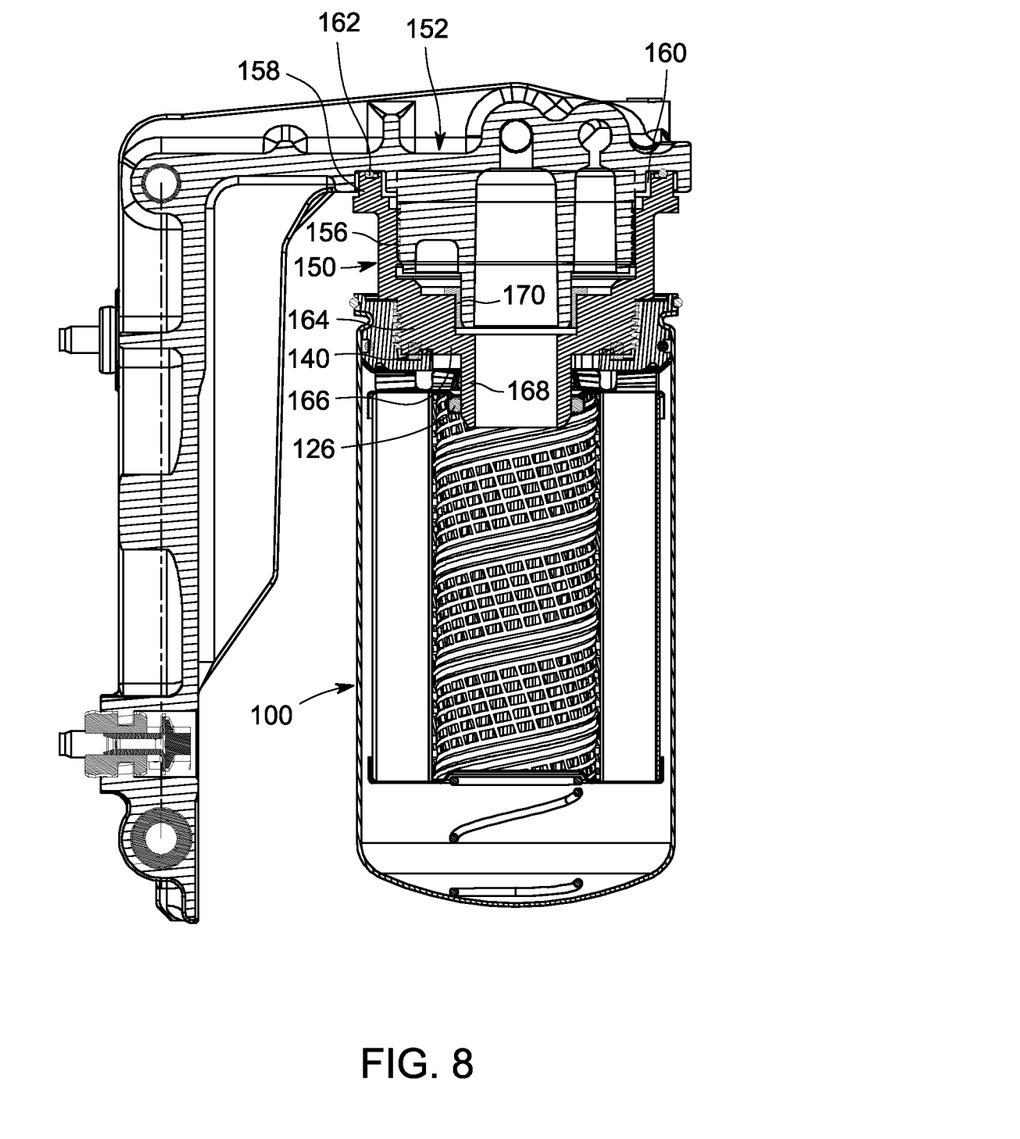
FIG. 8 illustrates an adaptor attached to a head and a filter attached to the adaptor.

FIG. 8 illustrates an adaptor 150 that is attached to a head 152 that can be used to attach the filter 100 to the head 152. The adaptor 150 includes threads 156 that engage with threads on the head 152, with an upper end 158 of the adaptor 150 extending into a circumferential recess 160 in the head 152. A seal 162 can be provided at the upper end 158 to seal with the head.

The adaptor 150 also includes a threaded intermediate section 164 that engages with the threads 132 of the filter 100, and the gasket seal 140 of the filter engages with a bottom surface 166 of the intermediate section. A center outlet spud or outlet tube 168 extends downwardly from the intermediate section 164 in a direction away from the head 152. The gasket 126 of the filter seals with the spud 168. A sealing gasket 170 is also provided between outlet passage in the head 152 and an interior surface of the intermediate section 164 to seal incoming fluid to be filtered from the filtered fluid.

Any of the individual features described with respect to FIGS. 1-5, 6-7 and 8 can be used individually or in any combination with other features in FIGS. 1-5, 6-7 and 8, and the features in FIGS. 1-5 can be used in any combination with the features described in FIGS. 6-7 and 8.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:
1. A combination comprising:
a filter head; and
a fluid filter, the fluid filter having:
a housing shell having a closed end and an open end and defining an interior space;

a filtration media disposed within the interior space of the housing shell and configured to filter a fluid;

a nutplate secured to the open end of the housing shell and closing the open end, the nutplate includes a surface with interior facing threads that secure the fluid filter to the filter head and an axially-extending continuous rim;

a first circumferential gasket disposed on the nutplate adjacent to a base of the threaded surface and radially inward of the threaded surface, the first circumferential gasket fluidly sealing with the filter head such that the first circumferential gasket prevents leakage of fluid to an outside of the fluid filter, the filter head having:
a circumferential recess,
an exterior threaded surface engaging the interior threaded surface of the fluid filter, and
a surface adjacent to the exterior threaded surface that engages with an axially upward facing surface of the first circumferential gasket, wherein the rim of the nutplate is received within the circumferential recess of the filter head such that a portion of the filter head extends along an outer periphery of the nutplate;

wherein the nutplate includes a groove formed therein adjacent to and radially inward of the base of the threaded surface, wherein the first circumferential gasket is disposed in the groove and faces axially upward away from the closed end, and wherein the first circumferential gasket does not fill the entire groove so that there is a space between a side of the gasket and a surface forming the groove.

2. The combination of claim 1, wherein the fluid filter includes a second circumferential gasket disposed radially inwardly of the first circumferential gasket, the second circumferential gasket facing radially inward; and
wherein the filter head includes an outlet tube that sealingly engages with the second circumferential gasket.

3. The combination of claim 1, wherein the first circumferential gasket is rectangular.

4. The combination of claim 2, wherein the second circumferential gasket is disposed on a plate that is disposed between the nutplate and an end of the filtration media.

5. The combination of claim 2, further comprising a plurality of fluid inlet openings defined between the first circumferential gasket and the second circumferential gasket, the fluid inlet openings providing fluid communication between an exterior of the fluid filter and the interior space of the shell.

6. The combination of claim 1, wherein the first circumferential gasket is tapered.

7. The combination of claim 2, wherein the second circumferential gasket is disposed on the nutplate.

8. The combination of claim 1, wherein the surface adjacent to the exterior threaded surface includes at least one circumferential flange projecting axially downwardly from the surface, wherein the at least one circumferential flange is configured to engage with the first circumferential gasket.

* * * * *